Figure 1:
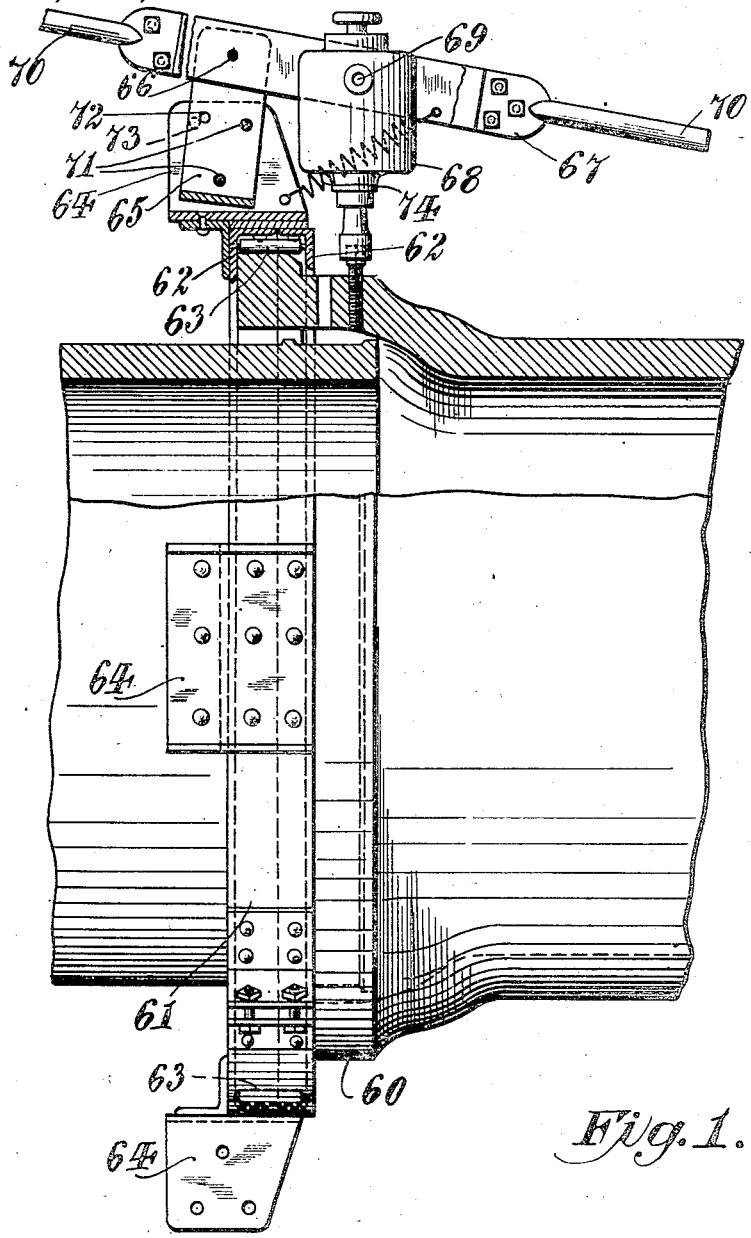

W. L. CHAPMAN.
PIPE LAYING APPARATUS.
APPLICATION FILED JULY 22, 1916.

1,220,190.

Patented Mar. 27, 1917.
2 SHEETS—SHEET 1.

INVENTOR.
William L. Chapman
BY
Emery, Booth, Janney & Varney
ATTORNEYS.

W. L. CHAPMAN.
PIPE LAYING APPARATUS.
APPLICATION FILED JULY 22, 1916.
1,220,190.
Patented Mar. 27, 1917.
2 SHEETS—SHEET 2.
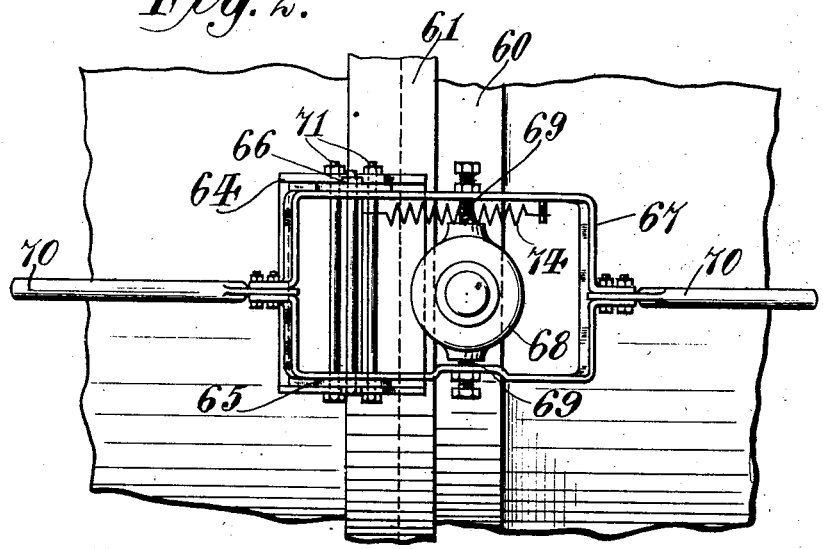
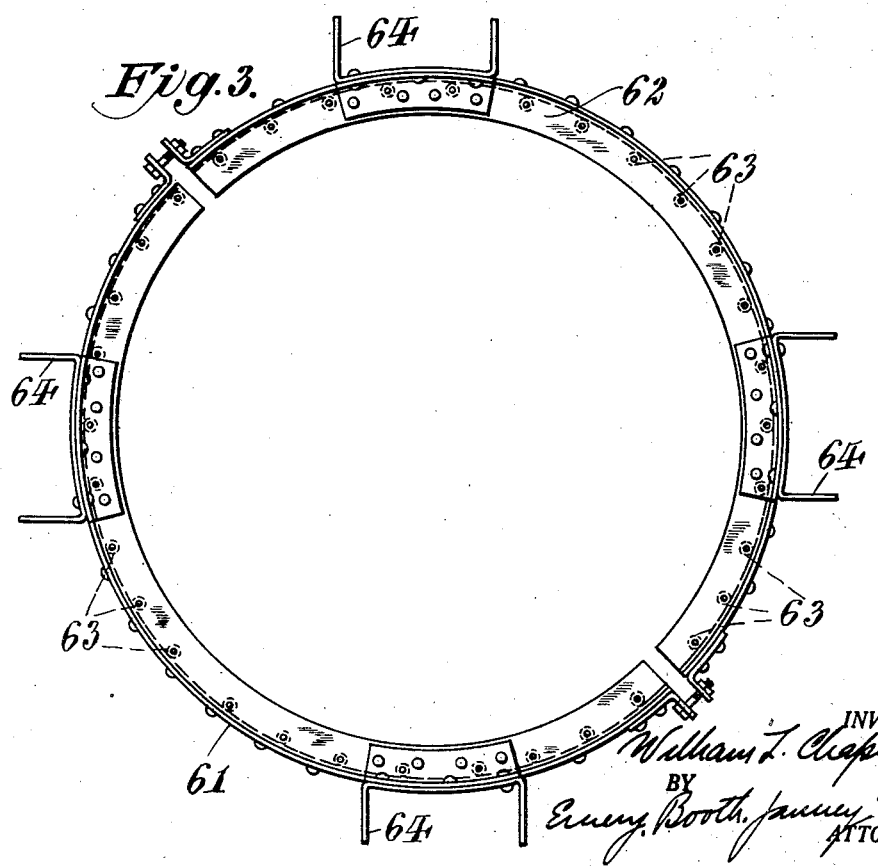

UNITED STATES PATENT OFFICE.

WILLIAM L. CHAPMAN, OF BROOKLYN, NEW YORK.

PIPE-LAYING APPARATUS.

1,220,190.  Specification of Letters Patent.  Patented Mar. 27, 1917.

Application filed July 22, 1916. Serial No. 110,680.

*To all whom it may concern:*

Be it known that I, WILLIAM L. CHAPMAN, a citizen of the United States, and a resident of the borough of Brooklyn of the city of New York, in the State of New York, having invented an Improvement in Pipe-Laying Apparatus, of which the following is a specification.

While the present invention is applicable to tools in general, and for work of different kinds, it is particularly adapted for jacking lead into the joints between pipe-sections to provide a means of calking said joints between the several sections after they have been assembled and sealed.

In the accompanying drawings, in which I show an embodiment of my invention, as actually employed by me in forcing cold lead into the connecting joints of pipe-sections recently used in constructing a pipe line across the "Narrows" of New York harbor, Figure 1 is a central longitudinal section taken through a joint between two pipe sections, showing the improved tool-carrying and lead-forcing device mounted thereon, Fig. 2 is a plan view of an air motor or wrench, and its associated parts mounted in one of the seats on the band to operate a suitable implement, in this case a gib-screw, and, Fig. 3 is a plan view of the band and its wrench-carrying seats.

Each of the pipe-sections used at the "Narrows" job was provided with a bell-mouth at one end which terminated in a circular flange 60 projecting laterally around the pipe. Upon and around this flange a circular band 61 was secured, with freedom for rotation, by providing a couple of flanges 62 upon the band, one on each side, to embrace the flange on the pipe; and roller bearings 63 were provided to eliminate friction and smooth the movement of the band. The band, as shown, was preferably made in two parts which were bolted together around the flange on the pipe.

One of the objects of the invention was to enable several lead-forcing devices to be operated at once, since in the job at the "Narrows," the head of each pipe-section was provided with thirty-two holes through which cold lead had to be forced into the shrinkage space left by the cooling of the molten lead seal. Accordingly, the band was fitted with four wrench-carrying seats 64 located at regular intervals around the circumference of the band, said seats being U-shaped (Fig. 3) and being rigidly secured to the band.

If four lead-forcing devices are to be operated together, each one of these seats will be provided with a wrench and its associated parts (to be described presently); but it will be obvious that the invention is equally applicable to one or more such devices, as may be desired, the band being shifted each time to bring the gib-screw or screws to the parts of the pipe's circumference where the lead is to be forced in. Thus, if one wrench be used the band will have to make a complete revolution before the job is finished; if two, a half revolution; and if four are used, as at the "Narrows" job, then a quarter of a revolution of the band will complete the operation.

As shown in the drawings, the wrench-carrying parts or units comprise a U-shaped supporting link 65 pivotally bolted to one of the seats 64 and pivotally supporting, through a bolt 66, a forked-arm 67 carrying the wrench 68 on a pivot 69. One of these units may be secured to each seat (as will obviously be the case where four wrenches are worked together), or, where only one wrench is used, the same unit is readily capable of being secured at will to any one of the seats 64. The wrench is supported between the two arms of its forked-carrier and the latter is preferably provided with handles 70 at each end for lifting the wrench and otherwise manipulating it, the wrench being supported between one of these handles and the fulcrum of the forked-carrier.

For retaining the wrench in a particular or definite position, means such as bolts 71 are provided to fasten and hold the U-shaped link or support 65 in a definite position. In the job at the "Narrows" the holes were provided in pairs, one hole being directly back of the other (see Fig. 1), so that both of the pipe holes 75, 76 in each pair were worked without shifting the band. For this purpose, the link or links 65 were each provided with two pairs of bolt holes 72 and the seats 64 were likewise provided with two corresponding pairs of bolt holes 73 for the bolt or bolts 71. As seen from Fig. 1, when the link 65 is in the position for working in the rear hole, one pair of bolt holes in the link will register with the corresponding pair in the seat and the link may be fastened and held in this position during the forcing operation by passing the upper bolt 71 through these two pairs of holes. In working the first hole, the other two pairs of holes are brought into register and the link fastened in that position by the upper bolt 71. Of course, as many pairs of bolt holes may be provided as required; and for working only one line of holes such as the holes 75, around the pipe, it is obvious that the link or links 65 may be set in one definite position, that is, the link 65 need not pivot but may be rigidly secured to the band.

Springs 74 are preferably provided, one on each side of the wrench to connect the wrench-carrying arm 67 and its seat 64 to hold the wrench normally in operative position with its work; for it will be understood that as the band revolves around the pipe, the weight of the wrench and its parts will not always be directed toward the pipe.

In a companion application, Serial No. 109,034 filed July 13, 1916, I have shown and described a pipe laying system and apparatus wherein the pipe-sections are inserted one into the other to form a pipe line, and the line thus formed progressively launched into position upon a skid or launchway. In the operation of that system, each pipe-section, after it is added to the end of the line, rests in the upper part of the skid with its bell-mouth presented upwardly and is then in a position for convenient application of the improved apparatus which I have described in the present application.

I do not limit myself, however, to the employment of my improved apparatus in that way, but simply suggest it as a convenient manner of procedure in using the same in connection with the pipe-laying system of my companion application.

In using my improved apparatus, where four wrenches or forcing devices are employed at once, a man is employed for each device, operating the wrench through the handle or handles 70. By this means the wrench is first brought into proper position for forcing in the lead, the bolt 71 being used, if desired (as where bolt holes 72 and 73 have been provided to bring the wrench in the particular position or positions). When the first hole or pair of holes 75, 76, has been worked, the band is then shifted to bring the wrench or wrenches to the next operating position after reversing the wrenches to withdraw the gib-screws, by means of the handle or handles.

In view of the foregoing description, it will be understood that the word "wrench" has been used to denote a motor or power device for producing rotary motion and is not to be construed in its narrower sense; and hence the word "wrench," as used in the claims hereinafter, should be interpreted accordingly.

I claim as my invention:

1. A motor-carrying device comprising in combination a circular band having means to secure it to the work to be operated upon, with freedom for rotation; a motor, a motor-carrying arm having means for pivotally supporting the motor thereon; and a supporting link pivoted to the band and to which the motor-carrying arm is pivotally secured, whereby the motor may be shifted with respect to the work.

2. A wrench-carrying device comprising in combination a circular band having means to secure it to the work to be operated upon with freedom for rotation with respect to the work; a supporting link pivoted to the band; a wrench-carrying arm pivoted to the supporting link; and a wrench adapted to operate a tool; said arm having a handle and means to pivot the wrench thereto intermediate the handle and supporting link.

3. A wrench-carrying device comprising in combination a circular band having means to secure it to the work to be operated upon with freedom for rotation with respect to the work; a U-shaped support pivoted to the band; and a wrench-carrying fork pivoted to the U-shaped support; said fork having a handle and means to pivot a wrench thereto between the two arms of the fork; the wrench being adapted to coöperate with a suitable tool.

4. A wrench-carrying device comprising in combination a circular band having means to secure it to the work to be operated upon with freedom for rotation with respect to the work; a U-shaped support pivoted to the band; means to fasten and hold said support in a definite position; and a wrench-carrying fork pivoted to the U-shaped support; said fork having a handle and means to pivot a wrench thereto between the two arms of the fork; the wrench being adapted to coöperate with a suitable tool.

5. A wrench-carrying device comprising a circular band provided with flanges to secure it upon the flanged end of a pipe with freedom for rotation around the pipe, and a plurality of U-shaped seats rigidly secured to the band at intervals around its circumference; in combination with a U-shaped support, a wrench-carrying fork pivoted to said support and having a handle, a wrench pivoted to said fork between its two arms and adapted to coöperate with a suitable tool; and means to pivot the U-shaped support, with its wrench-carrying fork and wrench, to any of the U-shaped seats at will.

6. A motor-carrying device comprising in combination a circular band having means to secure it to the work to be operated upon with freedom for rotation with respect to the work; a motor-carrying arm having means for pivotally supporting a motor thereon and means for adjusting the position of the motor thereon; and a supporting link pivoted to the band and to which the motor-carrying arm is pivotally secured.

7. A wrench-carrying device comprising in combination a circular band having means to secure it to the work to be operated upon, with freedom for rotation with respect to the work; a wrench-carrying arm having means for pivotally supporting the wrench thereon, including means for adjusting the wrench transversely; and a supporting link pivoted to the band and to which the wrench-carrying arm is pivotally secured, said supporting link being adjustable longitudinally of said wrench.

8. The combination with a device to perform work upon a pipe, of a circular band having means to secure it to the pipe with freedom for rotation around the pipe, and means to secure said device to said band with freedom for longitudinal and vertical movement to position said device in respect to the work to be performed and to advance it toward and withdraw it from said pipe during the performance of its work and after such performance respectively.

In testimony whereof, I have signed my name to this specification this tenth day of July, 1916.

WILLIAM L. CHAPMAN.